(12) United States Patent  
Zeimis, III et al.

(10) Patent No.: US 8,336,961 B2
(45) Date of Patent: Dec. 25, 2012

(54) STAND UP SEAT ASSEMBLY WITH RETRACTABLE REAR LEG

(75) Inventors: Peter Paul Zeimis, III, Shelby Township, MI (US); Robert J. Szybisty, Livonia, MI (US); Jeffrey P. Carroll, West Bloomfield, MI (US); Matthew J. McLaughlin, Chesterfield Township, MI (US); Nelson E. Hurst, III, Westland, MI (US)

(73) Assignee: Intier Automotive Inc, Newmarket (CA)

( * ) Notice: Subject to any disclaimer, the term of this patent is extended or adjusted under 35 U.S.C. 154(b) by 570 days.

(21) Appl. No.: 12/516,844

(22) PCT Filed: Dec. 4, 2007

(86) PCT No.: PCT/CA2007/002168
§ 371 (c)(1),
(2), (4) Date: Jan. 25, 2010

(87) PCT Pub. No.: WO2080/067648
PCT Pub. Date: Jun. 12, 2008

(65) Prior Publication Data
US 2010/0141004 A1    Jun. 10, 2010

Related U.S. Application Data

(60) Provisional application No. 60/872,693, filed on Dec. 4, 2006.

(51) Int. Cl.
*B60N 2/30* (2006.01)

(52) U.S. Cl. .................. 297/335; 297/336; 296/65.09
(58) Field of Classification Search .............. 297/335, 297/336; 296/65.09
See application file for complete search history.

(56) References Cited

U.S. PATENT DOCUMENTS

| | | | |
|---|---|---|---|
| 4,736,985 A | 4/1988 | Fourrey et al. | |
| 6,595,588 B2 | 7/2003 | Ellerich et al. | |
| 6,676,216 B1 | 1/2004 | Freijy et al. | |
| 7,040,684 B2 * | 5/2006 | Tame et al. | 297/336 |
| 7,300,107 B2 * | 11/2007 | Kammerer | 297/336 |
| 7,997,653 B2 * | 8/2011 | Szybisty et al. | 297/336 |
| 2005/0269830 A1 | 12/2005 | Epaud | |

FOREIGN PATENT DOCUMENTS

CA   2610712 A1   12/2006
WO   02096699 A1   12/2002

* cited by examiner

*Primary Examiner* — Anthony D Barfield
(74) *Attorney, Agent, or Firm* — Miller Canfield

(57) ABSTRACT

A seat assembly is provided for supporting an occupant above a floor in a vehicle. The seat assembly includes a seat cushion extending between front and rear ends. The front end is adapted to be pivotally coupled to the floor for pivoting the seat cushion between a seating position and a kneeling position. A seat back is pivotally coupled to the rear end of the seat cushion and is adapted to be releasably secured to the floor. A drive link is pivotally coupled between the floor and the seat back. The drive link urges the seat back to pivot relative to the seat cushion as the seat cushion pivots between the seating and kneeling positions thereby maintaining the seat back in a generally vertical orientation.

16 Claims, 5 Drawing Sheets

STAND UP SEAT ASSEMBLY WITH RETRACTABLE REAR LEG

CROSS REFERENCE TO RELATED APPLICATION

This application claims priority to and all the benefits of U.S. Provisional Application Ser. No. 60/872,693, filed on Dec. 4, 2006 and entitled "Stand Up Seat with Retractable Rear Leg."

BACKGROUND OF THE INVENTION

1. Field of the Invention

The invention relates to a seat assembly for an automotive vehicle. More particularly, the invention relates to a seat assembly that is capable of being moved forward and upward to a stand-up position to provide access to a rearward area of an automotive vehicle.

2. Description of Related Art

It is common in certain mini-van and sport utility vehicles to provide second and third row seating. Typically, the vehicle includes a pair of front doors adjacent front row seating and a pair of rear doors located adjacent the second row seating. The third row seating is located at the generally furthermost rear portion of the vehicle and is not located adjacent a door opening. Thus, passengers do not have direct access to the third row seating.

To provide access to the third row seating or a rear storage area, it is well known that the second row seating may have a releasable seatback locking mechanism which is capable of being manually actuated in order to pivot the seatback forwardly to an access position. Optionally, the second row seating may be moveable to a tumbled position adjacent the front row seating, such as disclosed in U.S. Pat. No. 6,135,555 to Liu et al. The tumbled position is attained by first folding the seat back flat against the seat cushion and then pivoting both the seat back and seat cushion about a pivot point at a lower front edge of the seat cushion approximately 90 degrees until the seat back and seat cushion are substantially upright. In the tumbled position, the seat back of the second row seating is disposed between the seat cushion of the second row seating and the front row seating. A passenger can then enter the vehicle through one of the rear doors, moving past the tumbled second row seating, to gain access to the third row seating or the rear storage area. Movement of the second row seating in this manner can be difficult and cumbersome, and the area of ingress and egress is often uncomfortably small.

In order to provide better access to the third row seating it has been proposed to move the second row seating to a stand-up position, such as disclosed in U.S. Pat. No. 6,676,216 to Freijy et al. The stand-up position is attained by pivoting the seat cushion forward about a pivot point at a lower front edge from a generally horizontal position for supporting a seat occupant to a generally vertical position. Next, the seat back is moved from a first vertical position for supporting the seat occupant in the seating position to a second vertical position forward and upward of the first vertical position. The seat cushion moves independently of the seat back requiring a two step process for operation.

It is therefore desirable to provide a seat assembly having a seat back pivotally coupled to a seat cushion and including a simple, robust mechanism for pivoting the seat back relative to the seat cushion as the seat assembly moves between a seating position and a stand-up position. It is also desirable to provide a latch mechanism for releasably securing the seat assembly to the floor in the seating position which does not protrude rearwardly from the seat back when the seat assembly is in the stand-up position.

SUMMARY OF THE INVENTION

According to one aspect of the invention, there is provided a seat assembly for supporting an occupant above a floor in an automotive vehicle. The seat assembly comprises a seat cushion extending between front and rear ends. The front end adapted to be pivotally coupled to the floor for pivotal movement between a generally horizontal seating position and a generally vertical kneeling position. A seat back is pivotally coupled to said rear end of said seat cushion and adapted to be releasably secured to the floor. A drive link is adapted to be pivotally coupled between the floor and the seat back, wherein the drive link urges the seat back to pivot relative to the seat cushion between a first vertical position and a second vertical position as the seat cushion pivots between the seating and kneeling positions thereby maintaining the seat back in a generally vertical orientation.

According to another aspect of the invention, there is provided a seat assembly for supporting an occupant above a floor in an automotive vehicle. The seat assembly comprises a seat back and a seat cushion extending between front and rear ends. The front end is adapted to be pivotally coupled to the floor for pivotal movement between a generally horizontal seating position and a generally vertical kneeling position. A drive link extends between a first end adapted to be pivotally coupled to the floor and a second end pivotally coupled to the seat back. The drive link urges the seat back to move about an arcuate path between a first vertical position and a second vertical position in response to pivotal movement of the seat cushion between the seating and kneeling positions thereby maintaining the seat back in a generally vertical orientation.

BRIEF DESCRIPTION OF THE DRAWINGS

Other advantages of the present invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
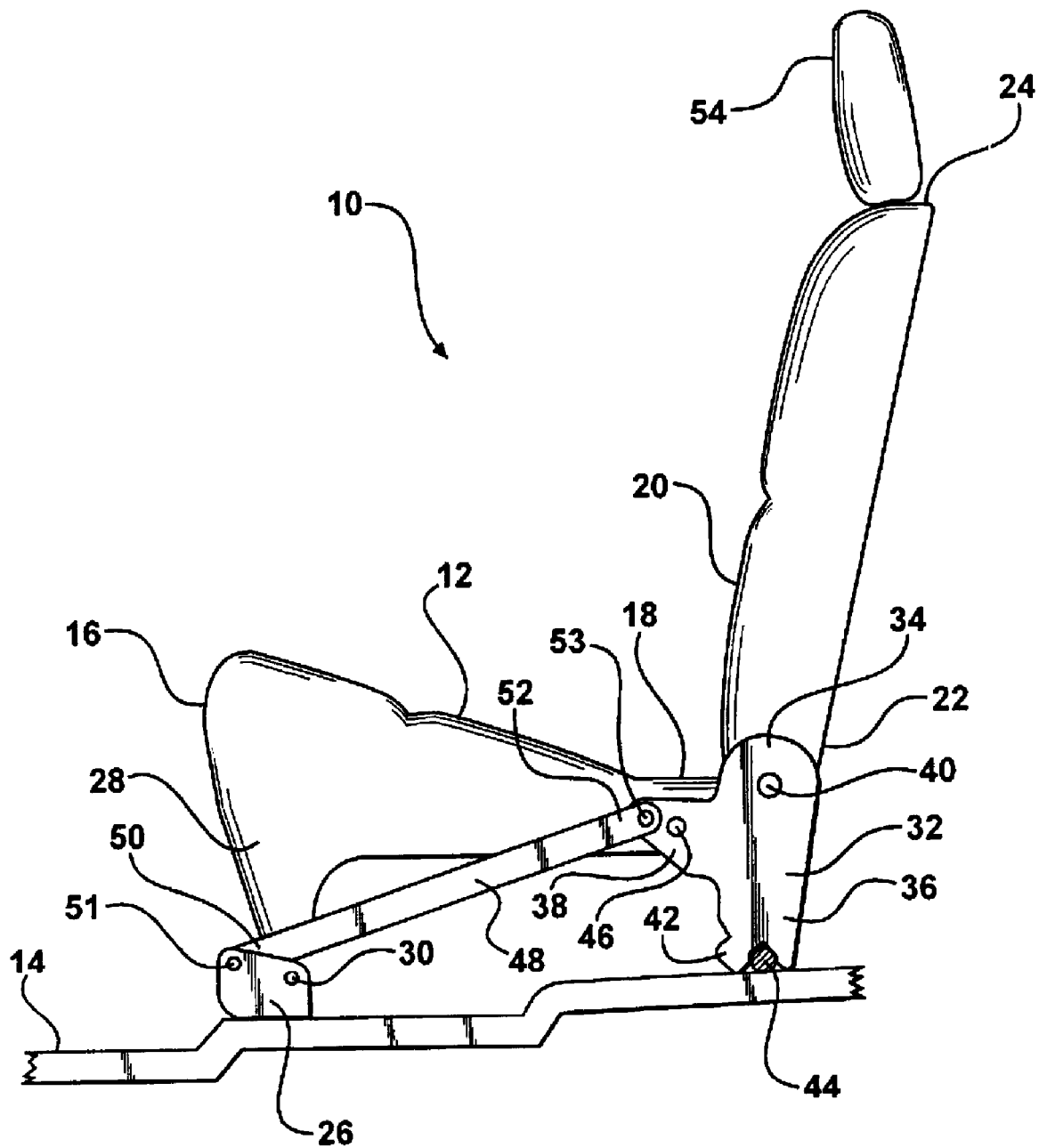
FIG. 1 is a side view of a seat assembly in a seating position including a hinge bracket and drive link according to one embodiment of the invention.

Referring to FIG. 1, a seat assembly for an automotive vehicle is generally shown at 10. The seat assembly 10 includes a seat cushion 12 for supporting a seat occupant above a floor 14 of the vehicle. The seat cushion 12 extends between a front end 16 and an opposite rear end 18. The seat assembly 10 also includes a seat back 20 for supporting a back of the seat occupant. The seat back 20 extends between a lower end 22 and an opposite upper end 24. The lower end 22 of the seat back 20 is operatively coupled to the rear end 18 of the seat cushion 12.

A forward floor bracket 26 is mounted to the floor 14 of the vehicle. The front end 16 of the seat cushion 12 includes a downward extending portion or a front leg 28 that is pivotally coupled to the floor bracket 26 at a first main pivot 30. The seat cushion 12 pivots about the first main pivot 30 between a generally horizontal seating position, shown in FIG. 1, and a generally vertical kneeling position, shown in FIG. 2. In the kneeling position, the rear end 18 of the seat cushion 12 is disposed above the front end 16. Although not shown, it is contemplated that a coil spring may be disposed about the first main pivot 30 between the front leg 28 and the floor bracket 26 to assist movement of the seat cushion 12 from the generally horizontal seating position to the kneeling position.

Figure 2:
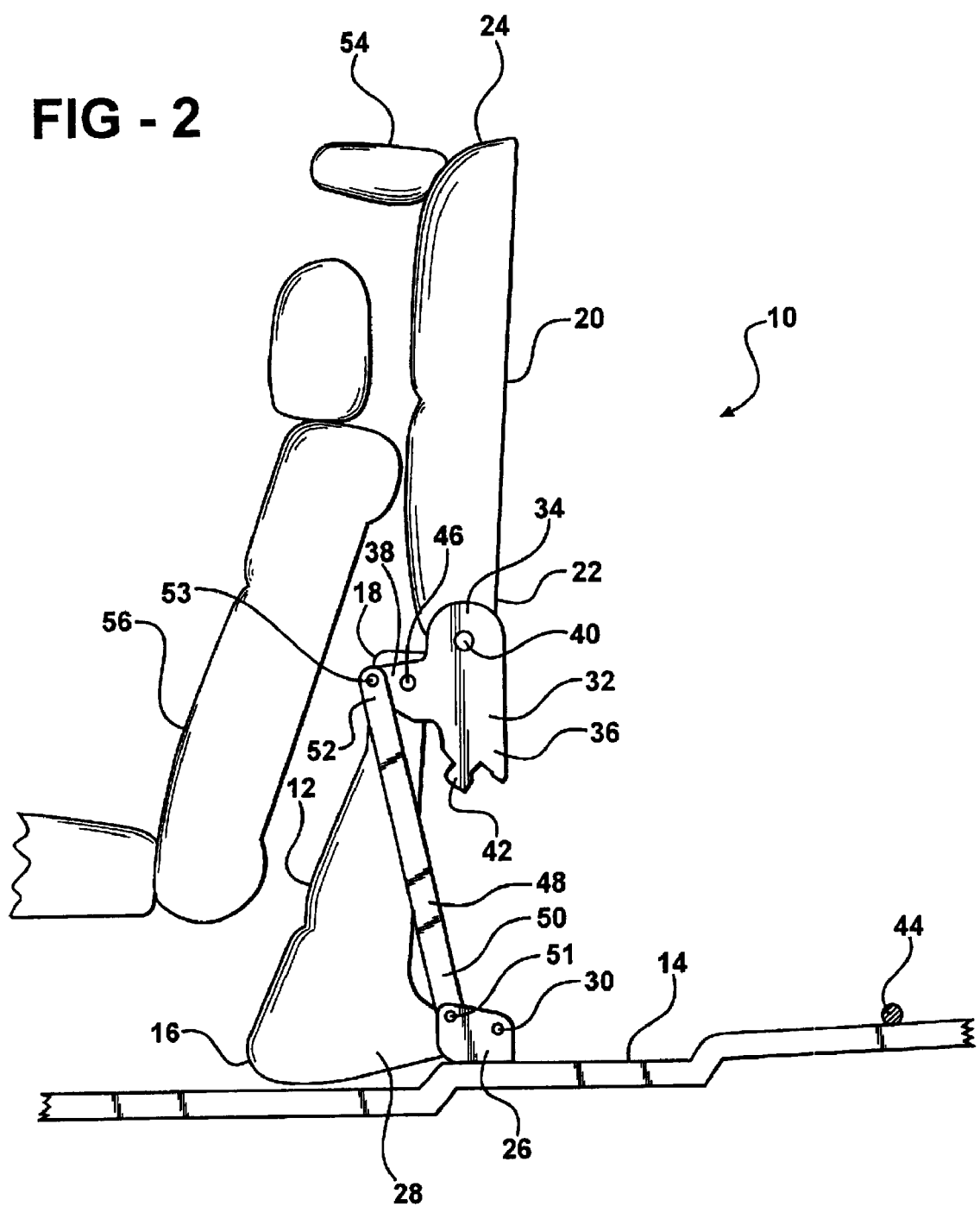
FIG. 2 is a side view of the seat assembly of FIG. 1 in a stand-up position.

A hinge bracket or B-bracket 32 operatively couples the seat back 20 and seat cushion 12 and allows the seat back 20 to pivot between a first vertical position when the seat cushion 12 is in the generally horizontal seating position, shown in FIG. 1, and a second vertical position, forward and upward of the first vertical position when the seat cushion 12 is in the kneeling position, shown in FIG. 2. The seat assembly 10 defines a seating position when the seat back 20 is in the first vertical position and the seat cushion 12 is in the generally horizontal seating position. The seat assembly 10 defines a stand-up position when the seat back 20 is in the second vertical position and the seat cushion 12 is in the kneeling position.

The hinge bracket 32 includes an upper end 34, a lower end defining a rear leg 36, and a forward extending portion 38. The lower end 22 of the seat back 20 is pivotally coupled to the upper end 34 of the hinge bracket 32. More specifically, the upper end 34 of the hinge bracket 32 is configured to receive a recliner mechanism 40 of any suitable type known in the art. The recliner mechanism 40 is disposed between the upper end 34 of the hinge bracket 32 and the lower end 22 of the seat back 20. The recliner mechanism 40 is operable between a locked state and an unlocked state allowing for selective angular adjustment of the seat back 20 relative to the seat cushion 12 between a plurality of reclined seating positions. The recliner mechanism 40 is in the locked state as the seat assembly 10 moves between the seating and stand-up positions. Therefore, the seat assembly 10 may also have no recliner mechanism 40 without varying from the scope of the invention.

The rear leg 36 of the hinge bracket 32 is releasably coupled to the floor 14 for securing the seat assembly 10 in the seating position. More specifically, the rear leg 36 includes a latch mechanism 42 of any suitable type known in the art. The latch mechanism 42 is operable between a latched state and an unlatched state. In the latched state, the latch mechanism 42 is securely coupled to a striker bar 44 mounted to the floor 14 and maintains the seat assembly 10 in the seating position. In the unlatched state, the latch mechanism 42 is released from the striker bar 44 to allow the seat assembly 10 to move between the seating position and the stand-up position.

The rear end 18 of the seat cushion 12 is pivotally coupled to the forward extending portion 38 of the hinge bracket 32 at a second main pivot 46. A drive link 48 extends linearly between a first end 50 and a second end 52. The first end 50 of the drive link 48 is pivotally coupled to the floor bracket 26, forward of the first main pivot 30, at first pivot 51. The second end 52 of the drive link 48 is pivotally coupled to the forward extending portion 38 of the hinge bracket 32, forward of the second main pivot 46, at second pivot 53.

A head restraint 54 is operatively coupled to the upper end 24 of the seat back 20. The head restraint 54 automatically pivots between a use position when the seat assembly 10 is in the seating position and a rotated position, generally perpendicular to the seat back 20, when the seat assembly 10 is in the stand-up position. The head restraint 54 may be actuated to the rotated position by a Bowden-type cable (not shown) operatively coupled to the latch mechanism 42, as is well known in the art. With the head restraint 54 in the rotated position, the overall height of the seat back 20 is decreased to avoid interference with a headliner (not shown) in the vehicle.

In operation, the seat assembly 10 is normally in the seating position, as shown in FIG. 1. A release handle (not shown) actuates the latch mechanism 42 to the unlatched state to release the striker bar 44 and allow the seat cushion 12 to pivot in a counterclockwise direction about the first main pivot 30 from the generally horizontal seating position to the kneeling position. As the seat cushion 12 pivots in the counterclockwise direction, the drive link 48 also pivots in the counterclockwise direction about the first pivot 51 and urges the hinge bracket 32 to pivot relative to the seat cushion 12 in a clockwise direction about the second main pivot 46. The clockwise movement of the hinge bracket 32 causes the seat back 20 to also pivot in the clockwise direction relative to the seat cushion 12 from the first vertical position to the second vertical position. At the same time, the head restraint 54 pivots from the use position to the rotated position. The seat assembly 10 is now in the stand-up position, adjacent to a forward seat 56, as shown in FIG. 2.

The orientation of the hinge bracket 32 relative to the seat back 20 remains the same as the seat assembly 10 moves between the seating and stand-up positions. In other words, the rear leg 36 is generally vertically aligned with the seat back 20 when the seat assembly 10 is in the seating and stand-up positions. Thus, when the seat assembly 10 is in the stand-up position the rear leg 36 and latch mechanism 42 do not protrude rearwardly from the seat back 20. This improves ingress and egress to an area behind the seat assembly 10. Safety is also improved because the rear leg 36 and latch mechanism 42 do not present a dangerous protrusion when the seat assembly 10 is in the stand-up position.

Additionally, the angular position of the seat back 20 relative to the hinge bracket 32 remains the same as the seat back 20 is automatically moved between the first vertical position and the second vertical position in response to pivotal movement of the seat cushion 12 between the seating position and the kneeling position. In other words, the pivotal movement of the seat cushion 12 between the seating position and the kneeling position automatically moves the seat back 20 about an arcuate path defined around the pivot 51 between the first and second vertical positions.

To return the seat assembly 10 to the seating position, the seat back 20 is moved rearwardly which causes the seat cushion 12 to pivot in the clockwise direction about the first main pivot 30 from the kneeling position to the generally horizontal seating position. As the seat cushion 12 pivots in the clockwise direction, the drive link 48 also pivots in the clockwise direction about the first pivot 51 and urges the hinge bracket 32 to pivot relative to the seat cushion 12 in the counterclockwise direction about the second main pivot 46. The counterclockwise movement of the hinge bracket 32 causes the seat back 20 to also pivot in the counterclockwise direction relative to the seat cushion 12 from the second vertical position to the first vertical position. The head restraint 54 is then manually moved from the rotated position to the use position. The seat assembly 10 is now in the seating position, as shown in FIG. 1.

Figure 3:
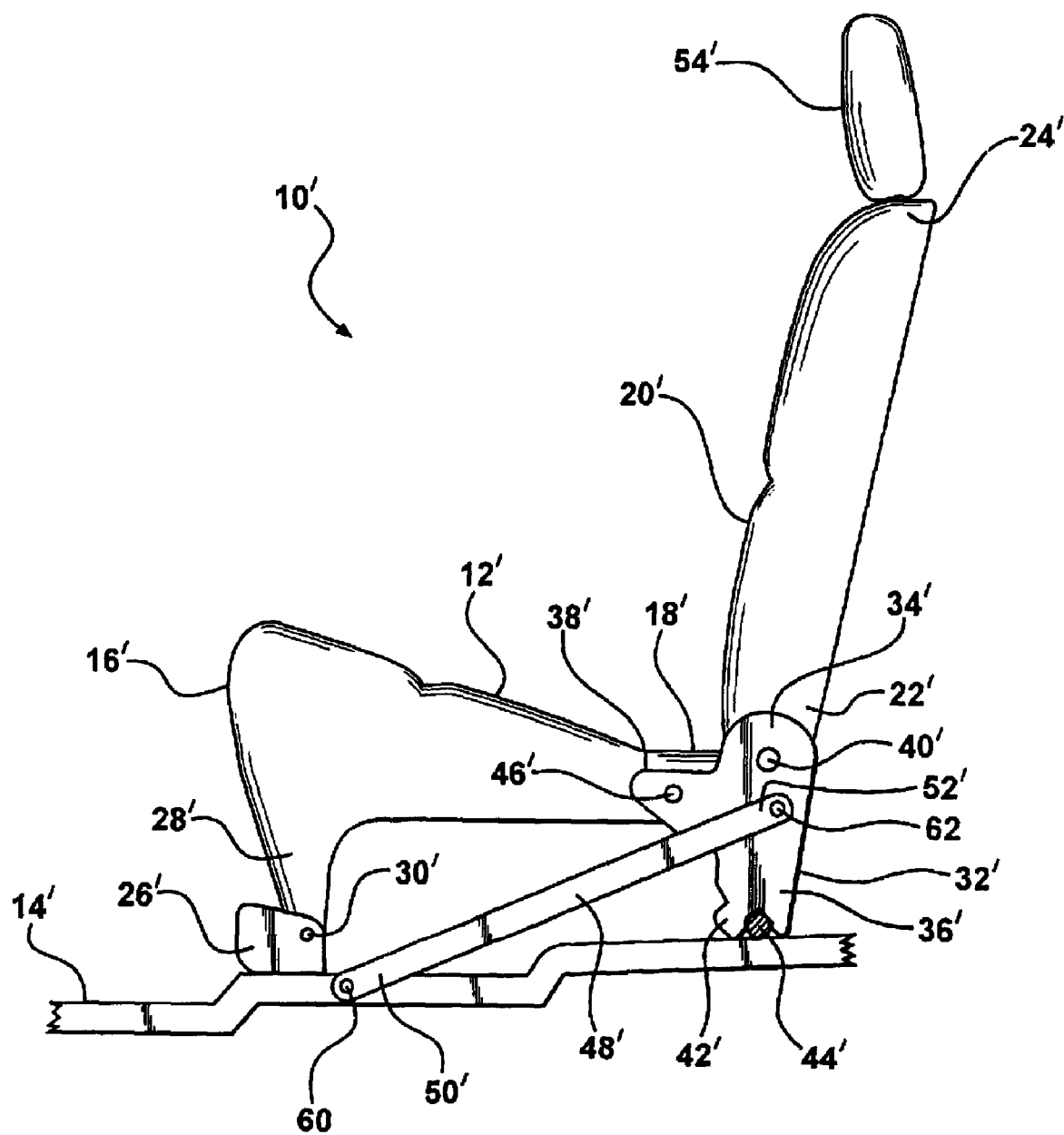
FIG. 3 is a side view of a seat assembly in a seating position including a hinge bracket and drive link according to a second embodiment of the invention.
Figure 4:
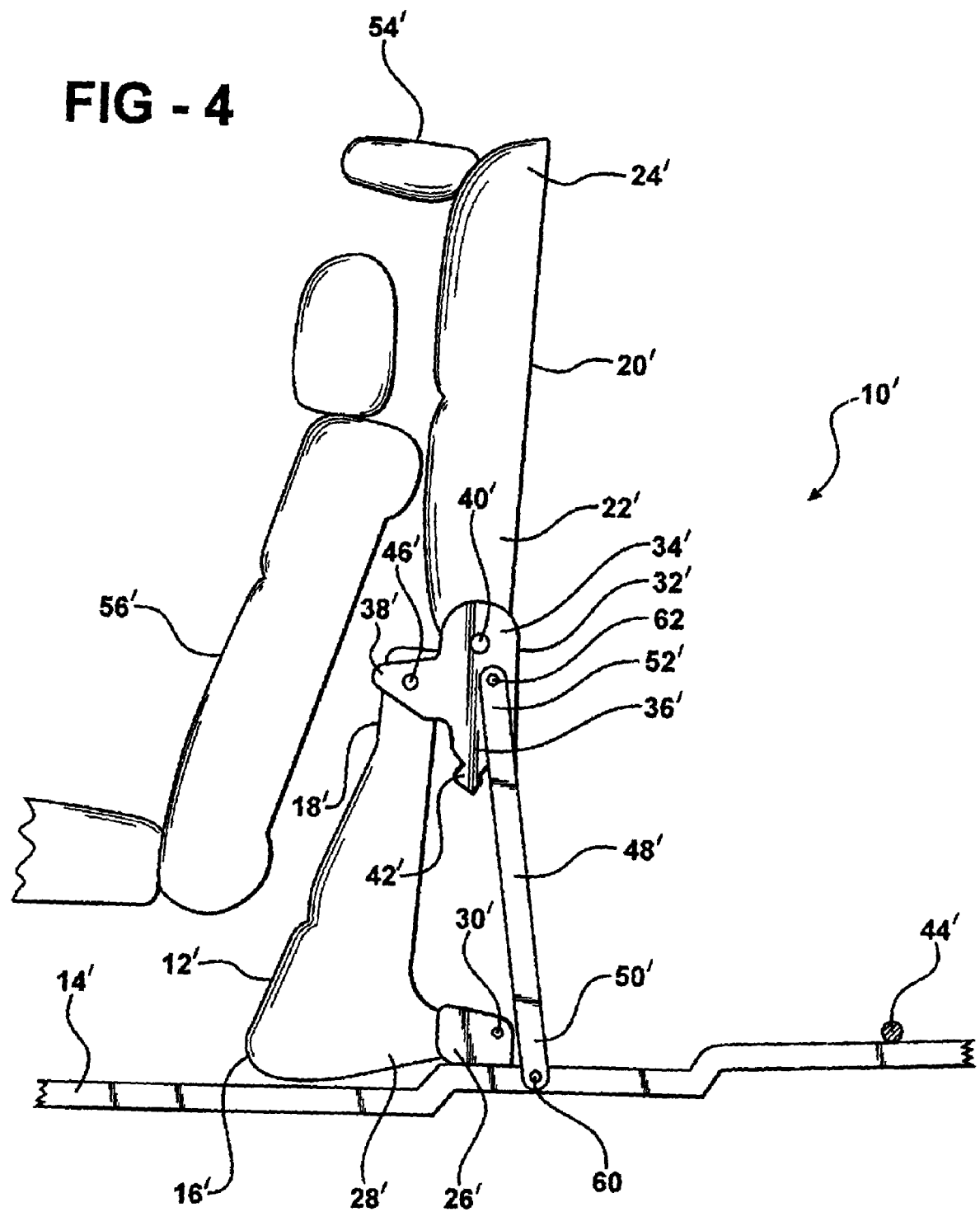
FIG. 4 is a side view of the seat assembly of FIG. 3 in a stand-up position.
Figure 5:
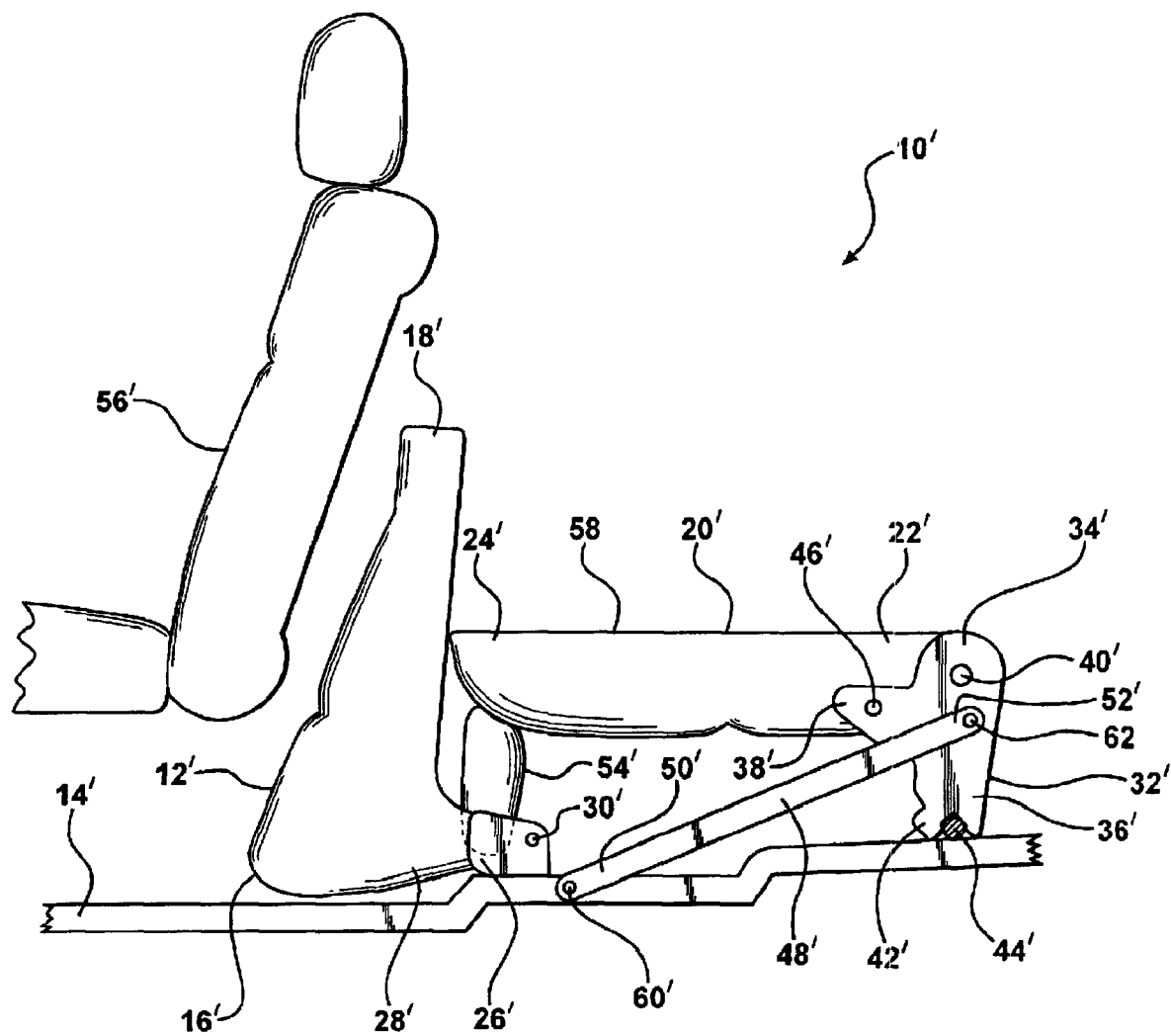
FIG. 5 is a side view of the seat assembly of FIG. 3 with a seat cushion in a kneeling position and a seat back in a stowed position.

Referring to FIGS. 3 through 5, wherein like primed reference numerals represent similar elements as those described above, in a second embodiment of the invention the rear end 18' of the seat cushion 12' is releasably coupled to the hinge bracket 32' at the second main pivot 46'. When the rear end 18' of the seat cushion 12' is coupled to the hinge bracket 32', the movement of the seat assembly 10' between the seating and stand-up positions is the same as described above with respect to the first embodiment. However, when the rear end 18' of the seat cushion 12' is uncoupled from the hinge bracket 32', the seat cushion 12' is free to move independently of the seat back 20' and pivot about the first main pivot 30' between the generally horizontal seating position, shown in FIG. 3, and the generally vertical kneeling position, shown in FIG. 5.

The recliner mechanism 40' is then operable to pivot the seat back 20' from any one of the plurality of reclined seating positions to a forwardly folded position, shown in FIG. 5. In the forwardly folded position, the seat back 20 is generally parallel with the floor and a back side of the seat back 20' presents a generally horizontal load floor surface 58.

The first end 50' of the drive link 48' is adapted to be pivotally coupled to the floor 14', rearward of the first main pivot 30', at floor pivot 60. The second end 52' of the drive link 48' is pivotally coupled to the hinge bracket 32', rearward of the second main pivot 46', at bracket pivot 62.

In operation, the seat assembly 10' is normally in the seating position, as shown in FIG. 3. The release handle actuates the latch mechanism 42' to the unlatched state to release the striker bar 44' and allow the seat cushion 12' to pivot in the counterclockwise direction about the first main pivot 30' from the generally horizontal seating position to the kneeling position. As the seat cushion 12' pivots in the counterclockwise direction, the drive link 48' also pivots in the counterclockwise direction about the floor pivot 60 and urges the hinge bracket 32' to pivot relative to the seat cushion 12' in the clockwise direction about the second main pivot 46'. The clockwise movement of the hinge bracket 32' causes the seat back 20' to also pivot in the clockwise direction relative to the seat cushion 12' from the first vertical position to the second vertical position. At the same time, the head restraint 54' pivots from the use position to the rotated position. The seat assembly 10' is now in the stand-up position, adjacent to a forward seat 56', as shown in FIG. 4.

To return the seat assembly 10' to the seating position, the seat back 20' is moved rearwardly which causes the seat cushion 12' to pivot in the clockwise direction about the first main pivot 30' from the kneeling position to the generally horizontal seating position. As the seat cushion 12' pivots in the clockwise direction, the drive link 48' also pivots in the clockwise direction about the floor pivot 60 and urges the hinge bracket 32' to pivot relative to the seat cushion 12' in the counterclockwise direction about the second main pivot 46'. The counterclockwise movement of the hinge bracket 32' causes the seat back 20' to also pivot in the counterclockwise direction relative to the seat cushion 12' from the second vertical position to the first vertical position. The head restraint 54' is then manually moved from the rotated position to the use position. The seat assembly 10' is now in the seating position, as shown in FIG. 3.

Additionally, beginning with the seat assembly 10' in the seating position, a second release handle (not shown) releases the rear end 18' of the seat cushion 12' from the hinge bracket 32' in order to pivot the seat cushion 12' in the counterclockwise direction about the first main pivot 30' from the generally horizontal seating position to the kneeling position. The recliner mechanism 40' is then actuated to pivot the seat back 20' from one of the plurality of reclined seating positions to the forwardly folded position. At the same time, the head restraint 54' pivots from the use position to the rotated position to avoid interference with a bottom side of the seat cushion 12'. The seat assembly 10' is now in a stowed position, as shown in FIG. 5.

It is contemplated that the seat back 20' could be biased toward the forwardly folded position such that upon actuating the recliner mechanism 40', the seat back 20' automatically pivots forward. In this case, as the seat back 20' pivots forward, a mechanism is provided to urge the seat cushion 12' to pivot from the generally horizontal seating position to the kneeling position. Any suitable mechanism known to one skilled in the art such as a mechanical spring or gas spring could be used.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A seat assembly for supporting an occupant above a floor in an automotive vehicle, said seat assembly comprising:
   a seat cushion extending between front and rear ends, said front end adapted to be pivotally coupled to the floor for pivotal movement between a generally horizontal seating position and a generally vertical kneeling position;
   a seat back pivotally coupled to said rear end of said seat cushion and adapted to be releasably secured to the floor; and
   a drive link adapted to be pivotally coupled between the floor and said seat back, wherein said drive link urges said seat back to pivot relative to said seat cushion between a first vertical position and a second vertical position as said seat cushion pivots between said seating and kneeling positions thereby maintaining said seat back in a generally vertical orientation; and
   a hinge bracket adapted to be releasably coupled to the floor and operatively coupled between said seat back and said seat cushion, wherein said hinge bracket is pivotally coupled to said rear end of said seat cushion for maintaining said vertical orientation of said seat back during pivotal movement of said seat cushion between said seating and kneeling positions, and wherein said rear end of said seat cushion is releasably coupled to said hinge bracket for pivotal movement between said seating and kneeling positions independent of said seat back.

2. A seat assembly as set forth in claim 1 including a recliner mechanism pivotally connecting said hinge bracket and said seat back for locking said seat back to said hinge bracket in each of said first and second vertical positions and maintaining both said hinge bracket and said seat back in said vertical orientation during movement between said first and second vertical positions.

3. A seat assembly as set forth in claim 2 wherein said front end of said seat cushion pivotally coupled to the floor defines a first main pivot and said hinge bracket pivotally coupled to said rear end of said seat cushion defines a second main pivot.

4. A seat assembly as set forth in claim 3 wherein said hinge bracket includes an upper end coupled to said seatback, a lower end adapted to be releasably coupled to the floor, and a forward extending portion pivotally coupled to said rear end of said seat cushion at said second main pivot.

5. A seat assembly as set forth in claim 4 wherein said drive link extends between a first end adapted to be pivotally coupled to the floor and a second end pivotally coupled to said hinge bracket.

6. A seat assembly as set forth in claim 5 wherein said rear end of said seat cushion is releasably coupled to said hinge bracket for pivotal movement between said seating and kneeling positions independent from said seat back.

7. A seat assembly as set forth in claim 6 wherein said seat back is selectively pivotally coupled to said hinge bracket for movement between an upright position and a forwardly folded position generally parallel to the floor when said seat cushion is in said kneeling position.

8. A seat assembly as set forth in claim 7 wherein said lower end of said hinge bracket is adapted to be releasably coupled to the floor, said seat back is selectively pivotally coupled to said upper end of said hinge bracket, and said rear end of said seat cushion is pivotally and releasably coupled to said forward extending portion of said hinge bracket.

9. A seat assembly for supporting an occupant above a floor in an automotive vehicle, said seat assembly comprising:
   a seat back;
   a seat cushion extending between front and rear ends, said front end adapted to be pivotally coupled to the floor for pivotal movement between a generally horizontal seating position and a generally vertical kneeling position; and
   a drive link extending between a first end adapted to be pivotally coupled to the floor and a second end pivotally coupled to said seat back, wherein said drive link urges said seat back to move about an arcuate path between a first vertical position and a second vertical position in response to pivotal movement of said seat cushion between said seating and kneeling positions thereby maintaining said seat back in a generally vertical orientation; and
   a hinge bracket adapted to be releasably coupled to the floor and operatively coupled between said seat back and said seat cushion, wherein said hinge bracket is pivotally coupled to said rear end of said seat cushion for maintaining a vertical orientation of said seat back during pivotal movement of said seat cushion between said seating and kneeling positions, and wherein said rear end of said seat cushion is releasably coupled to said hinge bracket for pivotal movement between said seating and kneeling positions independent of said seat back.

10. A seat assembly as set forth in claim 9 including a recliner mechanism pivotally connecting said hinge bracket and said seat back for locking said seat back to said hinge bracket in each of said first and second vertical positions and maintaining both said hinge bracket and said seat back in said vertical orientation during movement between said first and second vertical positions.

11. A seat assembly as set forth in claim 10 wherein said front end of said seat cushion pivotally coupled to the floor defines a first main pivot and said hinge bracket pivotally coupled to said rear end of said seat cushion defines a second main pivot.

12. A seat assembly as set forth in claim 11 wherein said hinge bracket includes an upper end coupled to said seatback, a lower end adapted to be releasably coupled to the floor, and a forward extending portion pivotally coupled to said rear end of said seat cushion at said second main pivot.

13. A seat assembly as set forth in claim 12 wherein said drive link extends between a first end adapted to be pivotally coupled to the floor and a second end pivotally coupled to said hinge bracket.

14. A seat assembly as set forth in claim 13 wherein said rear end of said seat cushion is releasably coupled to said hinge bracket for pivotal movement between said seating and kneeling positions independent from said seat back.

15. A seat assembly as set forth in claim 14 wherein said seat back is selectively pivotally coupled to said hinge bracket for movement between an upright position and a forwardly folded position generally parallel to the floor when said seat cushion is in said kneeling position.

16. A seat assembly as set forth in claim 15 wherein said lower end of said hinge bracket is adapted to be releasably coupled to the floor, said seat back is selectively pivotally coupled to said upper end of said hinge bracket, and said rear end of said seat cushion is pivotally and releasably coupled to said forward extending portion of said hinge bracket.

* * * * *